United States Patent [19]
Williams

[11] 3,863,139
[45] Jan. 28, 1975

[54] POWER SUPPLY CIRCUITS INCORPORATING VOLTAGE REGULATION

[75] Inventor: Malcolm Williams, Solihull, England

[73] Assignee: The Lucas Electrical Company Limited, Birmingham, England

[22] Filed: Sept. 24, 1973

[21] Appl. No.: 399,797

[30] Foreign Application Priority Data
Sept. 23, 1972 Great Britain .................... 44130/72

[52] U.S. Cl. ......................... 323/17, 321/2, 331/112
[51] Int. Cl. ............................................. H02m 3/32
[58] Field of Search ........... 321/2; 323/17, 22 T, 23, 323/DIG. 1; 331/112

[56] References Cited
UNITED STATES PATENTS
3,639,826  2/1972  Grundberg .............................. 321/2

OTHER PUBLICATIONS
Grafham, 200 Volt to 24 Volt DC Converter, Application Note 201.4, General Electric Rectifier Components Dept., March 1963, 2 pages.

Primary Examiner—A. D. Pellinen
Attorney, Agent, or Firm—Holman & Stern

[57] ABSTRACT

A power supply circuit has an oscillator producing alternate pulses at a required polarity separated by pulses of the opposite polarity. The pulses of required polarity serve both to turn on a transistor to connect the oscillator to a pair of supply lines and to charge a capacitor. When the oscillator produces pulses of the opposite polarity, the capacitor keeps the transistor on so that the capacitor discharges towards the supply lines. The oscillator is stopped by voltage sensitive means when the capacitor voltage reaches a predetermined value.

2 Claims, 1 Drawing Figure

PATENTED JAN 28 1975
3,863,139
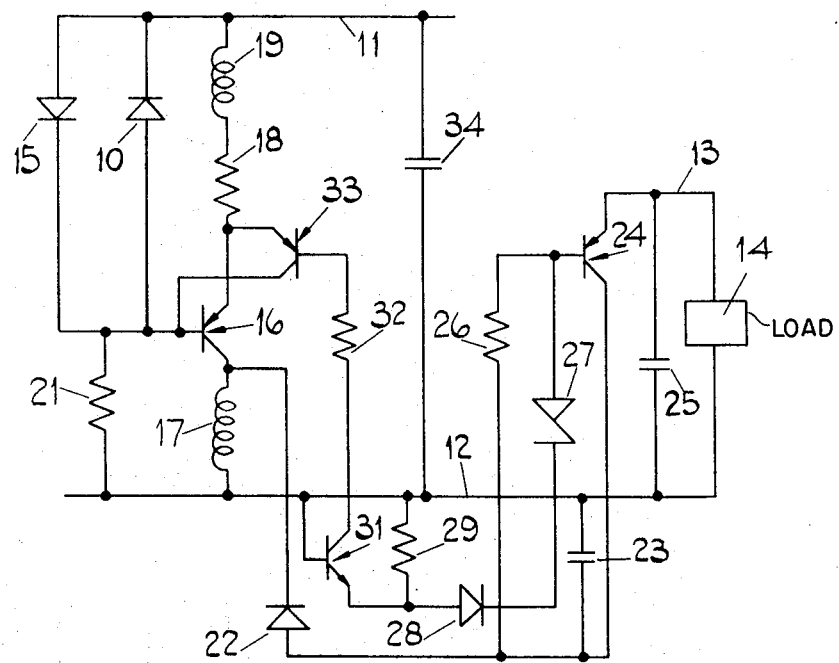

POWER SUPPLY CIRCUITS INCORPORATING VOLTAGE REGULATION

This invention relates to power supply circuits.

A power supply circuit according to the invention comprises a pair of supply lines between which a predetermined potential is to be maintained, an oscillator producing alternate pulses at the required polarity separated by pulses of the opposite polarity, the pulses of the required polarity serving both to turn on a transistor to connect the oscillator to the supply lines, and to charge a capacitor, said capacitor serving when the oscillator is producing pulses of said opposite polarity to maintain the transistor on so that the capacitor discharges towards the supply lines, and voltage sensitive means for stopping the oscillator when the voltage across the capacitor reaches a predetermined value.

Preferably, a reservoir capacitor is connected across the supply lines.

The accompanying drawing is a circuit diagram illustrating one example of the invention.

Referring to the drawing, there is provided a positive supply line 11 and an earthed supply line 12. In a typical arrangement the line 11 is a 12 volt line on a vehicle, and it is required to produce between a line 13 and the line 12 a negative supply for powering a load 14 connected between the lines 13, 12. Typically, the load is an electronic network employing mos devices.

The line 11 is connected through a pair of oppositely poled diodes 15, 10 in parallel to the base of a p-n-p transistor 16, the transistor 16 having its collector connected to the line 12 through the primary winding 17 of a step-down transformer, its emitter connected to the line 11 through a resistor 18 and the secondary winding 19 of the transformer in series, and its base connected to the line 12 through a resistor 21. The collector of the transistor 16 is connected by way of the cathode-anode path of a diode 22 and a capacitor 23 in series to the line 12, and the junction of the diode 22 and capacitor 23 is connected to the collector of a p-n-p transistor 24, the emitter of which is connected to the line 13. The lines 13, 12 are bridged by a capacitor 25. The junction of the diode 22 and the capacitor 23 is also connected through a resistor 26 to the base of the transistor 24, and the base is further connected through a Zener diode 27, a diode 28 and a resistor 29 in series to the line 12. The junction of the diode 28 and the resistor 29 is connected to the emitter of an n-p-n transistor 31 having its base connected to the line 12 and its collector connected through a resistor 32 to the boss of a p-n-p transistor 33, the collector and emitter of which are connected respectively to the base and emitter of the transistor 16. The potential between the lines 11, 12 is smoothed by a capacitor 34 connected between the lines 11, 12.

When the circuit is first switched on, current flows through the winding 19, the resistor 18, the emitter-base of the transistor 16 and the resistor 21 to turn on the transistor 16, the base potential being set by the diode 15. As soon as the transistor 16 starts to conduct, a voltage is developed across the winding 17 which induces a voltage in the winding 19 which increases conduction, and the transistor 16 quickly saturates. The emitter current is limited by the voltage induced in the winding 19 and the resistor 18, and the collector current is limited by the inductance of the winding 17. The base current of the transistor 16 is equal to the difference between the emitter current and collector current, and as the collector current increases, the base current decreases until a point is reached at which the transistor 16 is no longer saturated, whereupon the transistor 16 switches off rapidly, and the cycle is repeated. The oscillator is arranged to produce a substantially square wave output.

When the output voltage from the oscillator is negative, the diode 22 is forward biased and current flows to charge the capacitor 23, the current also flowing by way of the resistor 26 and the base-emitter of the transistor 24 to turn on the transistor 24, and so provide the required output between the lines 13, 12. When the output voltage from the oscillator is positive, the diode 22 is reverse biased, but the capacitor 23 discharges through the resistor 26 and the base-emitter of the transistor 24, so keeping the transistor 24 conducting, and maintaining a supply between the lines 13, 12. The reservoir capacitor 25 smooths the supply between the lines 13, 12.

It will be appreciated that the oscillator will operate with a mark-space ratio which varies in accordance with the load across the lines 13, 12. If the drain across the lines 13, 12 is small, then there will be a substantial voltage across the capacitor 23 when the oscillator produces a negative output pulse, and the time taken for the energy stored in the transformer to be dissipated will be considerably shorter than when the voltage across the capacitor 23 is low.

During a negative pulse, the Zener diode is normally conductive and small current flows in the resistor 29. However, this current is insufficient to turn on the transistor 31 unless the voltage across the capacitor 23 exceeds a predetermined value, at which point the conduction in the Zener diode 27 increases to a value such that the transistor 31 conducts. When the transistor 31 conducts, its collector current flows through the resistor 32 to turn on the transistor 33, which short-circuits the transistor 16 so that the oscillator ceases to operate.

I claim:

1. A power supply circuit comprising in combination first and second supply lines, an oscillator connected between said first and second supply lines, and output terminal for said oscillator, a third line which is to be maintained at a predetermined potential with respect to the second supply line, a series circuit connecting said output terminal to said third line, said series circuit including a diode and the base-emitter of a transistor, the collector of said transistor being connected to said output terminal through said diode, a capacitor connected between said output terminal and said second supply line by way of said diode, said capacitor charging when said transistor is being held on by the oscillator output, and discharging to hold said transistor on when the oscillator output is blocked by said diode, a circuit connected across said capacitor and including a voltage-sensitive device which conducts when the voltage across said capacitor reaches a predetermined level, and means operable when said device conducts for stopping the oscillator.

2. A circuit as claimed in claim 1 in which the circuit connected across said capacitor includes a Zener diode and the base-emitter of a further transistor, the collector of said further transistor being coupled to the oscillator, and said further transistor conducting when the Zener diode breaks down and stopping the oscillator.

* * * * *